Nov. 30, 1965  E. C. BRUNS  3,220,276
POSITION ANALOG UNIT FOR AUTOMATIC CONTROLS
Filed Feb. 10, 1964  4 Sheets-Sheet 1

INVENTOR.
EDWARD C. BRUNS

Nov. 30, 1965  E. C. BRUNS  3,220,276

POSITION ANALOG UNIT FOR AUTOMATIC CONTROLS

Filed Feb. 10, 1964  4 Sheets-Sheet 2

Nov. 30, 1965   E. C. BRUNS   3,220,276
POSITION ANALOG UNIT FOR AUTOMATIC CONTROLS
Filed Feb. 10, 1964   4 Sheets-Sheet 3

United States Patent Office 3,220,276
Patented Nov. 30, 1965

3,220,276
POSITION ANALOG UNIT FOR AUTOMATIC CONTROLS
Edward C. Bruns, Cincinnati, Ohio, assignor to The Cincinnati Milling Machine Co., Cincinnati, Ohio, a corporation of Ohio
Filed Feb. 10, 1964, Ser. No. 343,767
4 Claims. (Cl. 74—409)

The present invention relates to automatically controlled machine tools and more particularly to a mechanism to reduce positional errors by reducing an error component in the signal from a position analog unit where the error component is caused by misalignment of members in the control mechanism.

It is a common practice in position control systems using resolvers to provide a position analog unit with an instrument gearing mechanism including a precision rack extending along and parallel to the ways on which a machine slide is moved. This rack is engaged by a pinion carried by the slide and as the slide is moved the pinion is caused to rotate and drive the rotor of the resolver to produce the position analog signal in a closed loop servo control system. The pinion must be properly engaged with the rack at all times to eliminate backlash when the slide movement is reversed and if the pinion is rotatable on a fixed axis in the slide, the rack must be exactly parallel to the ways on which the slide is moved. It is very difficult, if not impossible, to locate the rack and attach it to the machine such that it is exactly parallel with the slide ways, the problem becoming especially acute in machines having slides movable over long ways, for example several hundreds of inches in length.

It is therefore an object of this invention to provide a mechanical drive system for a position analog unit wherein a rack is attached to one of two relatively movable machine members and a pinion is engaged therewith to drive the unit when the members are relatively moved but in which system a lack of exact parallelism between the rack and slide ways can be tolerated without the introduction of excessive error.

It is a further object of this invention to provide a unique floating pinion arrangement in which the precision rack is always engaged by the pinion such that backlash is eliminated therebetween even though the rack is not exactly parallel to the direction of relative movement of the two members by which the rack and pinion, respectively, are carried and in which system the float of the pinion does not introduce excessive error.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form this invention utilizes a pinion carried by one member and engaged with a rack attached to a second member in a system where the pinion is movable along the length of the rack when the two members are relatively moved. The pinion is simultaneously movable in an arcuate path toward and away from the rack to follow any deviations from an exactly parallel relation between the rack and the direction of relative movement of the two members. A compensation mechanism is included between the pinion and an electrical resolver which produces an output signal corresponding to the instantaneous position of the one member relative to the other. This compensation mechanism transmits rotation of the pinion due to its movement along the rack while minimizing any introduction of error due to the arcuate movement of the pinion in following the rack as the rack deviates from a path that is exactly parallel with the direction of relative movement of the two members.

A clear understanding of the construction and operation of the mechanism of this invention can be obtained from the following detailed description of a preferred embodiment of the mechanism, reference being made in the description to the attached drawings wherein.

Figure 1:
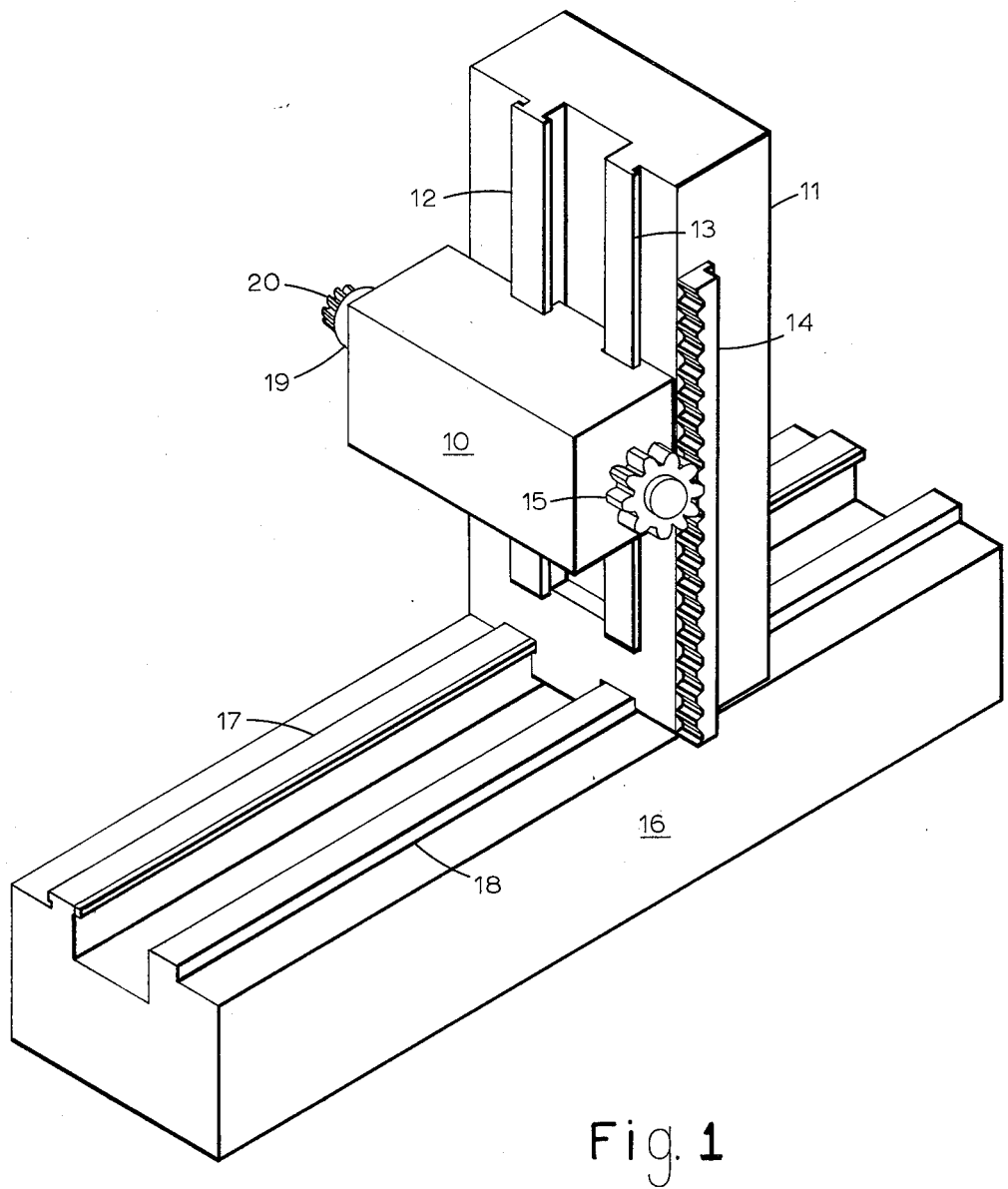
FIG. 1 is a simplified perspective view of a milling machine having a slide movable along ways and a rack and pinion drive (shown enlarged for clarity) connected to a position analog unit to signal the instantaneous position of the slide.

In FIG. 1 a spindle carrier 10 of a three axis machine is supported for vertical movement along a column 11 on which ways 12, 13 are attached. A toothed precision rack 14 is fixed to the column 11 and is oriented to be parallel to the ways 12, 13 within the tolerances permissible in the system as determined by the requirements of the system and the position analog unit to be described. The rack 14 is engaged by a pinion 15 extending from the rear of the spindle carrier 10 in which the position analog unit is received. The rack 14 and pinion 15 are shown out of proportion in FIG. 1 for illustration only, since both would be precision made and considerably smaller relative to the machine in reality. As the spindle carrier 10 is moved along the ways 12, 13, the pinion is rotated to drive the position analog unit. The column 11 is also movable along the machine base 16 on ways 17, 18 attached thereto and a similar rack and pinion mechanism (not shown) is conventionally supplied to provide a feed-back for control of the movement of the column. The machine quill 19 is movable in and out of the spindle carrier 10 to provide the third axis of movement of a cutter 20 rotatably supported in the quill 19. The axial position of the quill 19 is controlled in the same manner as the position of the spindle carrier 10 on the column 11 and the column 11 along the base 16.

Figure 3:
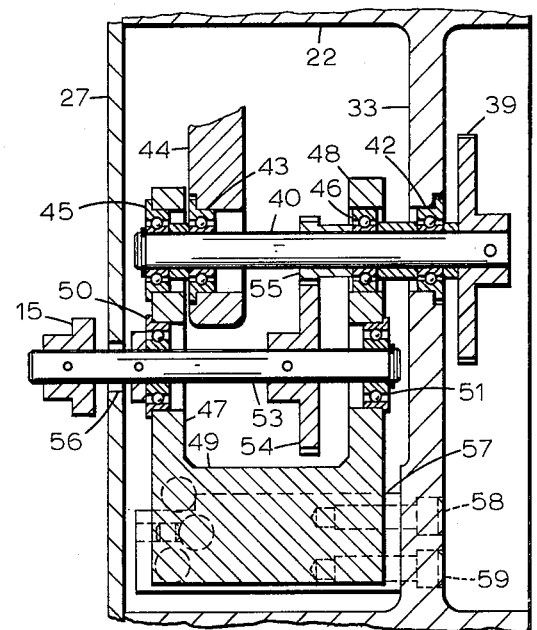
FIG. 3 is a section of the mechanism of FIG. 2 taken on line 3—3 therethrough.
Figure 2:
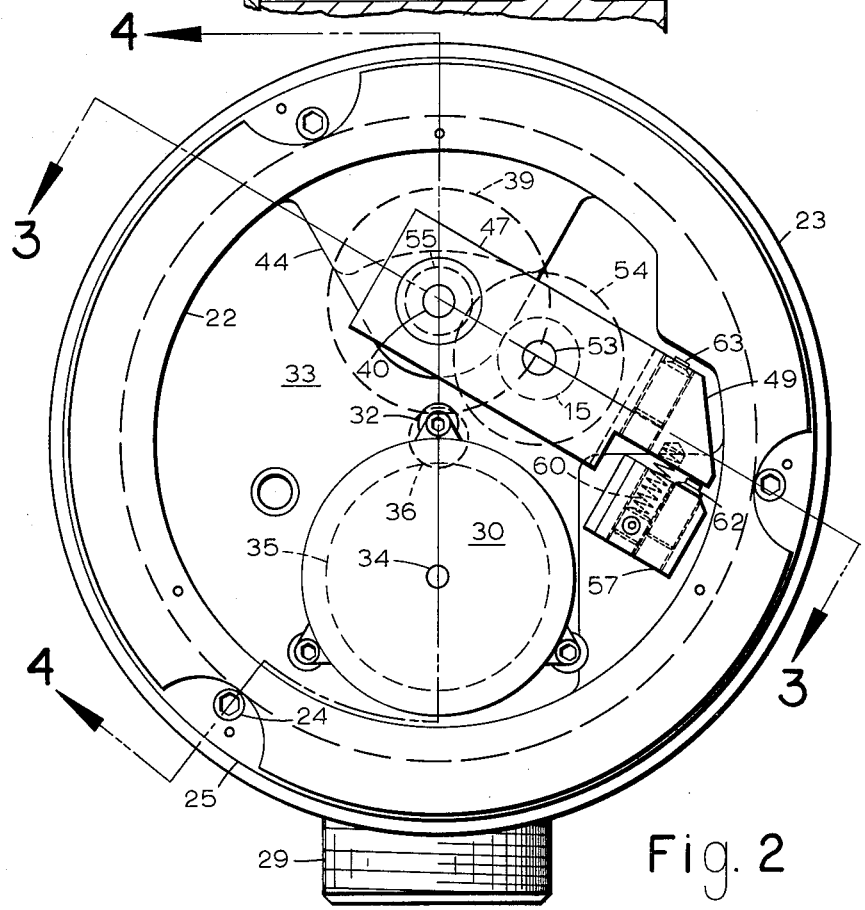
FIG. 2 is an end view of a position analog unit with its cover plate removed to reveal its interior.
Figure 4:
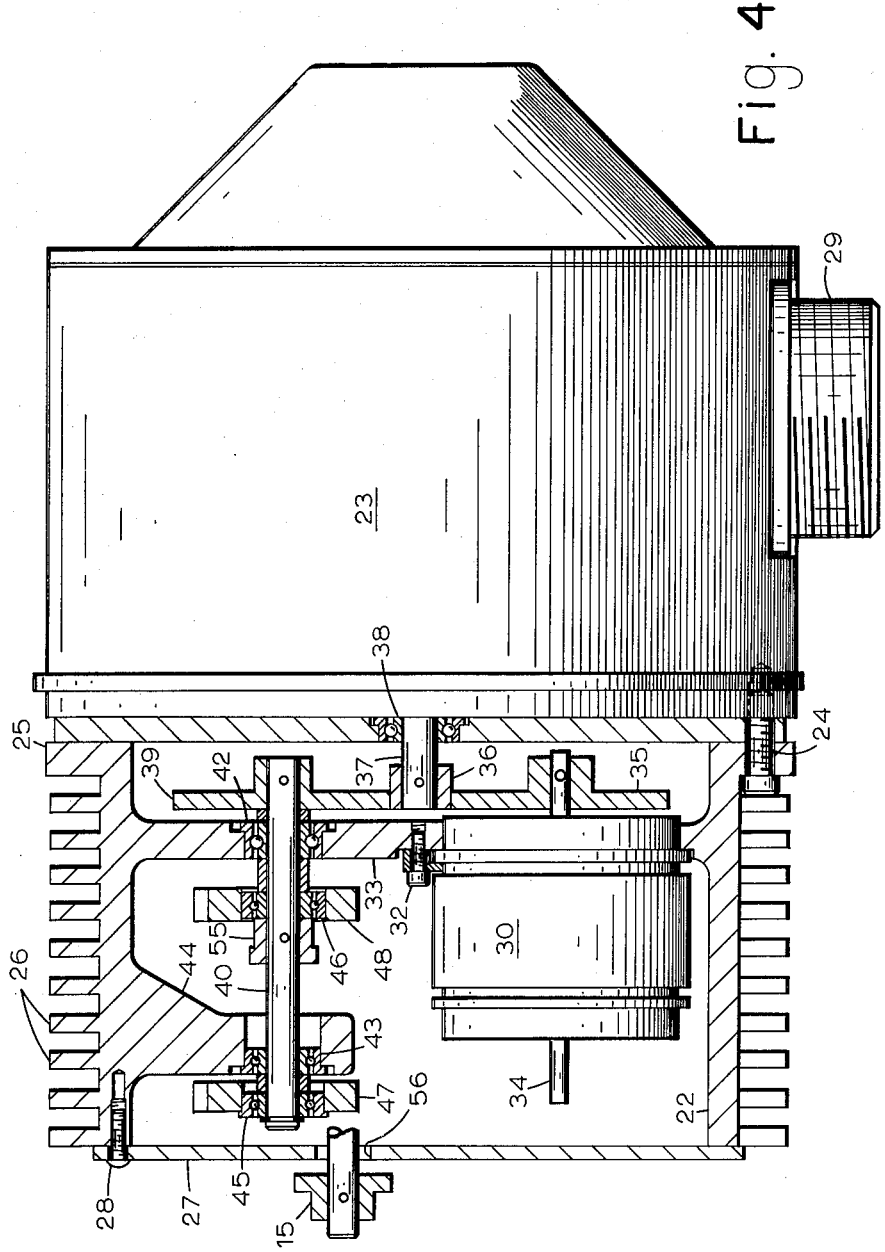
FIG. 4 is a section of the mechanism of FIG. 2 taken on line 4—4 therethrough.

The gearing mechanism in the position analog unit from which the pinion 15 extends is shown in detail in FIGS. 2, 3 and 4. The unit is enclosed in a housing 22 which is attached to a box 23 by machine screws 24 through a mounting flange 25. The housing has a series of fins 26 formed thereon to provide surface area to improve the cooling efficiency of the unit. A cover plate 27 is attached by screws 28 to cover the end of the housing 22 opposite the box 23. The box 23 encloses a set of resolvers, not shown, each of which is comprised of a stator and a rotor. The resolvers provide an electrical signal output in accordance with the rotation of their rotors which are connected by gearing, also enclosed in the box 23 but not shown, in a multi-speed system. Systems of this type are known in the art and for that reason the resolvers and their gearing are not shown in detail herein. The present invention is confined to the mechanism by which rotation is imparted to one of the resolver rotors and, in the preferred embodiment, this one resolver rotor is that of the fine position or highest speed resolver to which the other resolver rotors are connected by conventional gearing. The box 23 also encloses the electrical connections to the resolvers and a plug 29 by which the resolvers are connected in a control system.

The mechanism of the invention has included therein a motor 30 secured in the housing 22 by screws 32 threaded into a mounting bulkhead 33. The motor 30 is energized to drive unidirectionally to provide a constant torque force on its output shaft 34. A gear 35 is fixed on the shaft 34 and it is engaged with a gear 36 which in turn is fixed on the rotor shaft 37 of the fine position resolver. The shaft 37 extends out of the box 23 through a bearing 38 and into the housing 22. The motor 30 is stalled by the load thereon in normal operation and the constant torque produced by it is transmitted to the gear train now to be described and functions to eliminate backlash in the gear train. The gear 36 is in mesh with a gear 39 that is fixed on the end of a shaft 40. The shaft 40 is rotatably held in bearings 42, 43 that are held in the bulkhead 33 and a boss 44 extending into the unit from the housing 22. A pair of bearings 45, 46 are received on the shaft 40 at spaced locations and these are held in the parallel arms 47, 48 of a yoke 49 such that it is rendered rotatable over the shaft 40. The arms 47, 48 each have another bearing 50, 51 therein and a shaft 53 is received through these other bearings for rotation on an axis parallel to the axis of the shaft 40. A gear 54 is fixed on the shaft 53 and is in driving engagement with a gear 55 fixed on the other shaft 40. The one gear 54 is allowed to roll on the other gear 55 in an orbital fashion when the yoke 49 is swung around the shaft 40 by virtue of the described construction. The shaft 53 extends outward through a clearance opening 56 in the cover plate 27 and the pinion 15 which engages the rack 14 is fixed on the end thereof. A block 57 is secured in the housing 22 by screws 58, 59 and it contains a spring 60 that extends therefrom to engage the yoke 49 and to produce a force thereon which swings it in a direction to hold the pinion firmly against the rack 14. The limits of swing of the yoke 49 are set by a pair of stops 62, 63 which are threaded through the block 57 and yoke 49, respectively. Thus it can be seen that the yoke 49 is allowed to swing around the shaft 40 to hold the pinion 15 engaged with the rack 14 despite slight deviations of the rack 14 from a location parallel to the path of movement of the spindle carrier 10, this path being established by the ways 12, 13. The drive train from the pinion 15 to the resolver rotor shaft 37 remains complete and free of backlash despite the movement of the pinion 15 relative to the housing 22 by the limited orbital movement of the gear 54 around the gear 55.

The construction described can introduce an error in the drive to the resolver shaft 37 due to the swing of the pinion 15. By proper design of the system, as can be illustrated by the diagramatic showing of FIG. 5 in which dimensions and movements are shown exaggerated for purposes of illustration and by an analysis of the diagram, the error can be minimized. The gears 15, 54 and 55 and the rack 14 are shown in a reference position relationship. The gears 15 and 54 are shown at some other positions 15' and 54', respectively which correspond to a location along the rack 14 which at that location is displaced to the position 14' due to its lack of parallelism with the path of movement of the spindle carrier 10 which carries the pinion 15. The point of contact of the pinion 15 and rack 14, when these are at locations 15' and 14', is referenced 64. It can be seen that a component of rotation equal to the angle T has been imparted to the gear 15 during its swinging movement upward to the position 15' and it is this rotation through the angle T which can introduce an error into the drive of the resolver 30 by producing rotation of the gear 55. Pure rolling contact between the gears 54 and 55 is desired but is difficult to achieve due to the constantly changing angular relations. Complete elimination of the described error is virtually impossible to achieve, although with the proper selection of the radii of the gears 15, 54, and 55 and by the proper orientation of the mechanism, the error can be minimized and held within acceptable limits.

Figure 5:
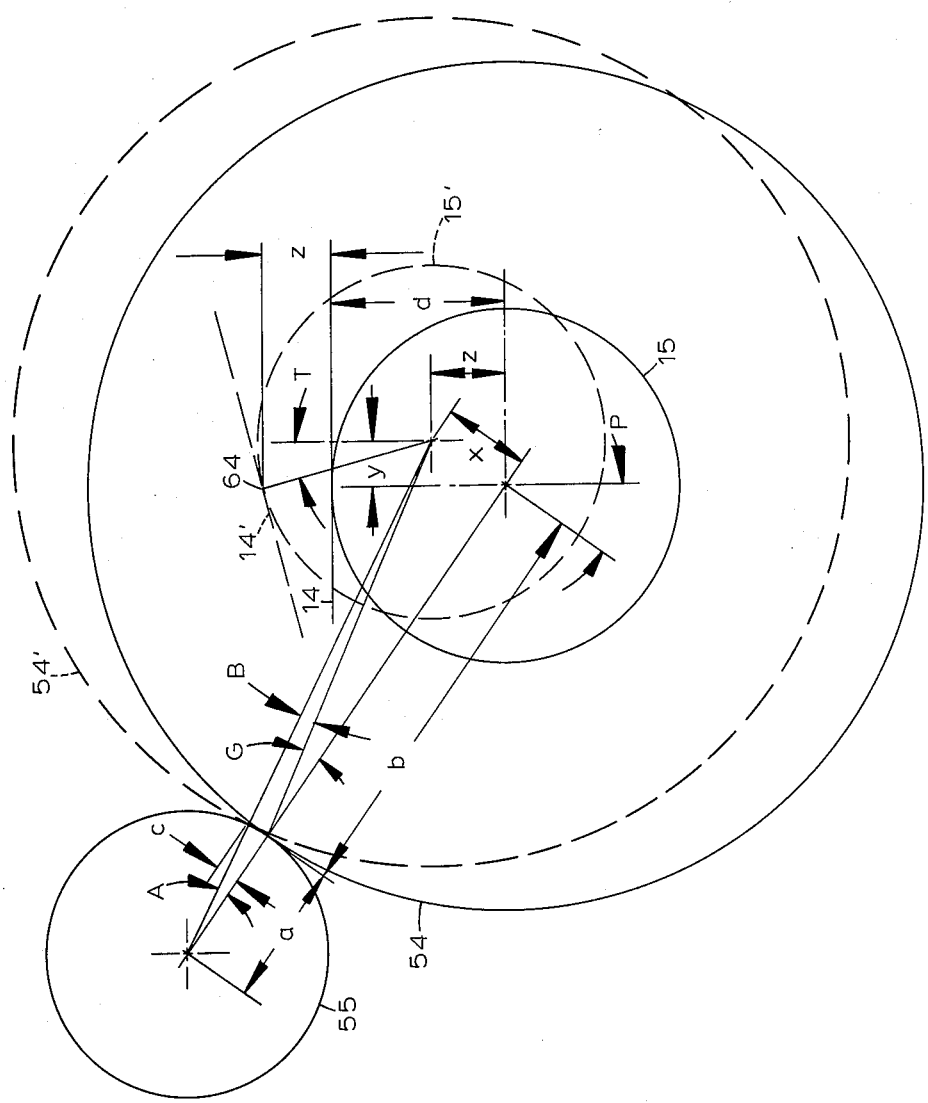
FIG. 5 is a diagrammatic showing of the angular relationships and directions of relative movement of the members in the mechanism of FIG. 2.

The error imparted by the rotational component angle T can be obtained through an analysis of the diagram of FIG. 5. In the analysis, movement of the gear 15 along the rack 14 can be omitted and an analysis based solely upon transverse shift of the rack 14 and a swing of the gear 15 to follow it will give valid results since this is the relationship to be corrected. The angle P in the diagram is formed between a reference line perpendicular to the direction of travel of the spindle carrier 10 in the particular mechanism described and by a straight line joining the points indicating the center of the gear 15 in its reference position and its center when moved upward to the location 15'. While the actual line traced by the center between these two points is an arc, a straight line is a very close approximation since in actual practice the distance would be 0.030 inch or less in most cases since reasonably accurate location of the rack 14 is possible. The angle P is equal to an angle between a line joining the centers of gears 54, 55 and a line extending along the ideal direction for location of the rack 14 within acceptable limits of error arising from the fact that the dimension $x$ is truly an arc and not a line perpendicular to the line joining the centers of gears 54, 55. The horizontal distance $y$ (as viewed in FIG. 5) can be expressed in terms of the angle P and the tolerable vertical distance $z$ through which the gear 15 is allowed to move. The expression is:

$$Y = z \tan P \qquad (1)$$

The straight line distance $x$ between the two center locations of the gear 15 can be expressed as $$x = y \csc P = z \tan P \csc P \qquad (2)$$

Based solely on an upward shift of the rack 14 and the swing of the pinion 15, the distance $y$ is equal to the horizontal shift in the point of contact of the rack 14 and pinion and a ratio expression of the angle T can be made such that $$\frac{T}{y} = \frac{360}{2\pi d} \qquad (3)$$

where $d$ is the radius to the pitch circle of the gear 15. Therefore the angle T can be represented by the following expression.

$$T = \frac{360y}{2\pi d} \qquad (4)$$

The Expression 4 involves an approximation since the dimension $y$ is a straight line rather than an arc of the circumference of the gear 15 but since the difference would be very small in view of the small length of $y$, the approximation is valid and the results are not significantly affected.

Using the same type ratio as in Equations 3 and 4 the angle A, which is the rotation of the line joining the centers of the gear 15 and the gear 55 resulting from the movement of the gear 15 through the angle T, can be expressed as $$A = \frac{360c}{2\pi a} \qquad (5)$$

where $a$ is the radius to pitch circle of the gear 55 and $c$ is the chordal distance between the original point at which the line between centers intersected the pitch circles of the gears 54 and 55 and the point at which that line intersects after the swing of the gear 54 with the gear 15. The ratio $$\frac{c}{a} = \frac{x}{a+b} = \frac{z \tan P \csc P}{a+b} \qquad (6)$$

can be stated where $b$ is the radius to pitch circle of the gear 54 and Equation 2 is substituted to eliminate the dimension $x$. Therefore $$c = \frac{az \tan P \csc P}{a+b} \qquad (7)$$

Using the same ratio approach as in Equations 3 and 4, the angle B on FIG. 5 can be expressed as $$B \frac{360c}{2\pi b} \quad (8)$$

The angle G can be expressed as $$G = A + B \quad (9)$$

since the sum of the angles in a triangle must equal 180 degrees and since a straight line is 180 degrees and by substituting Equations 5 and 8 therein the following expression can be stated.

$$G = \frac{360c}{2\pi}\left(\frac{1}{a}+\frac{1}{b}\right) \quad (10)$$

The angular error E introduced into the system is equal to the difference between the angles G and T since the angle G represents an ideal angular motion of the gear 54 so that the gear 55 would not be rotated due to the swinging movement of the gears 54 and 15 while the angle T represents an actual angular movement of the gears 15 and 54. The expression then is $$E = G - T \quad (11)$$

and the value E is dimensioned in degrees.

By substituting various of the Equations 1 through 10 in Equation 11 and by factoring, the result can be expressed as follows.

$$E = \frac{360z \tan P}{2}\left[\frac{(a \csc P)}{a+b}\left(\frac{1}{a}+\frac{1}{b}\right)-\left(\frac{1}{d}\right)\right] \quad (12)$$

The Equation 12 can be put in a slightly more convenient form by substitution of equivalents for cosecant and tangent functions.

$$E \frac{360z}{2\pi \cos P}\left[\left(\frac{a}{a+b}\right)\left(\frac{1}{a}+\frac{1}{b}\right)-\frac{(\sin P)}{d}\right] \quad (13)$$

The Equation 13 yields a fairly convenient expression for use in designing the mechanism of FIGS. 2, 3 and 4.

$$\left(\frac{a}{a+b}\right)\left(\frac{1}{a}+\frac{1}{b}\right)-\frac{(\sin P)}{d}\right] \cong 0 \quad (14)$$

When the Equation 14 is as near equal to zero as design considerations will allow with values of a system substituted therein, the best selection and arrangement of gears in the unit has been made. While this is not exactly true due to the aprroximations as pointed out in the derivation, the degree of accuracy is quite good and the errors from these approximations can be disregarded in practical applications. It can be seen that for any three selected radii of gears, $a$, $b$ and $d$, the angle P can be determined to produce a minimum error. The angle P can be considered as being the same as the angle included between a line parallel to the ideal direction of alignment of the rack 14 and a line joining the centers of gears 55 and 15 as previously pointed out. It can also be seen that if the angle P is determined by other considerations such as space or interference with other structure, then the best radii of gears can be selected with not too much difficulty.

In a system designed in accordance with the teaching of this invention where the angle P was designed at 30 degrees and a tolerance of 0.030 corresponding to the dimension z in FIG. 5 was used, a rotational error of 0.055 degree existed. This resulted in an error component of only 0.000010 inch in position included in the electrical signal from the highest speed resolver of the system for each 0.001 inch of rack deviation. In that case, the gears 15, 54 and 55 were selected to have the following radii:

| | | |
|---|---|---|
| Gear 15 | inches | 0.318 |
| Gear 54 | do | 0.625 |
| Gear 55 | do | 0.250 |

In the system, the gear drive ratios were such that the resolver rotor shaft 37 made one revolution for each 0.200 inch of movement of the pinion 15 along the rack 14, the resolver from which the shaft 37 extends being the fine position resolver in the multispeed system. Therefore the designed system with a rack aligned to within a maximum range of deviation from parallel of plus or minus 0.015 inch would have a maximum error range in positioning due to rack misalignment of plus or minus 0.00015 inch which is a very accurate system. That alignment tolerance for parallelism of the rack is reasonable even on very long paths of movement.

What is claimed is:

1. In a machine having a position analog unit with an electrical device therein including a rotatable element for producing an electrical signal in accordance with relative movement of two machine members along a predetermined line of travel, said position analog unit being attached to one of said machine members, a transmission for rotating the rotatable element comprising:
   (a) a rack fixed to the other of said machine members and extending approximately parallel to the predetermined line of travel of the machine members,
   (b) a pinion engaged with said rack,
   (c) means for supporting said pinion in the position analog unit for rotation on an axis swingably movable toward and away from said rack a limited amount and including a bias device to urge said pinion toward said rack, and
   (d) means for connecting said pinion to the rotatable element and including a first rotatable gear swingably movable with said pinion and a second gear in mesh with said first gear and on which said first gear rolls when said pinion is swingably moved.

2. In a machine having a position analog unit with an electrical device therein including a rotatable element for producing an electrical signal in accordance with bidirectional relative movement of two machine members, said position analog unit being attached to one of the machine members, a transmission for rotating the rotatable element comprising:
   (a) a rack fixed to the other of said machine members and extending approximately parallel to the direction of relative movement of the machine members,
   (b) a first shaft journalled for rotation on a fixed axis in the position analog unit,
   (c) a yoke swingably received over said first shaft,
   (d) a second shaft journalled in said yoke,
   (e) a pinion fixed on said second shaft,
   (f) a driving gear fixed on said second shaft,
   (g) a driven gear fixed on said first shaft and engaged with said driving gear for rotation thereby when said pinion is rotated, said driving gear rolling around said driven gear when said yoke is swung,
   (h) means for connecting said first shaft to the rotatable element for rotation thereof when said pinion is rotated, and
   (i) bias means for swinging said yoke and holding said pinion engaged with said rack as said two members are relatively moved, said pinion being laterally swung across the direction of relative movement by said bias means through swinging of said yoke as said rack deviates from a line parallel to said direction of relative movement.

3. A position analog unit for producing an electrical signal in accordance with relative movement of two machine members along a predetermined line of travel comprising:
   (a) a housing attached to one of said machine members,
   (b) an electrical device supported in said housing having a rotatable member therein adapted to produce a signal varying in accordance with rotation thereof,
   (c) a rack fixed to the other of said machine members and extending approximately parallel to the direction of relative movement of the machine members, (d) a first gear received in said housing and rotatable therein on a fixed axis,
(e) means for rotating the rotatable member of said electrical device in accordance with rotation of said first gear,
(f) a second gear,
(g) means for supporting said second gear in the housing for limited orbital movement around said first gear while in engagement therewith,
(h) a pinion attached to said second gear for rotational and orbital movement therewith, said pinion extending from said housing adjacent said rack,
(i) means for biasing said second gear and pinion to orbit in one direction to hold said pinion in engagement with said rack, said second gear and pinion swinging orbitally as the machine members are relatively moved along the predetermined line of travel and as said rack deviates from a parallel relation with the predetermined line of travel,
(j) said first and second gears and said pinion selected and arranged in the housing in accordance with the expression $$\left(\frac{a}{a+b}\right)\left(\frac{1}{a}+\frac{1}{b}\right)-\left(\frac{\sin P}{d}\right)\cong 0$$

where $a$ is the radius of the pitch circle of said first gear, $b$ is the radius of the pitch circle of said second gear, $d$ is the radius of the pitch circle of said pinion, and $P$ is the angle included between the predetermined line of travel and a straight line through the center of said first and second gears when said pinion is engaged with an exactly parallel portion of said rack.

4. A position analog unit for producing an electrical signal in accordance with relative movement of two machine members along a predetermined line of travel comprising:
(a) a housing attached to one of said machine members,
(b) an electrical device supported in said housing and having a rotatable member therein adapted to produce a signal varying in accordance with rotation thereof,
(c) a rack fixed to the other of said machine members and extending approximately parallel to the direction of relative movement of the machine members,
(d) a first gear received in said housing and rotatable therein on a fixed axis,
(e) means for rotating the rotatable member of said electrical device in accordance with rotation of said first gear,
(f) a yoke received in said housing for swinging movement around the fixed axis of said first gear,
(g) a shaft in said yoke rotatable on an axis parallel to the axis of said first gear,
(h) a second gear fixed to said shaft and engaged with said first gear,
(i) a pinion on said shaft, and
(j) means for biasing said yoke to swing said pinion toward said rack to maintain said rack and pinion engaged as the machine members are moved along the predetermined line of travel,
(k) said first and second gears and said pinion selected and arranged in the housing in accordance with the expression $$\left(\frac{a}{a+b}\right)\left(\frac{1}{a}+\frac{1}{b}\right)-\left(\frac{\sin P}{d}\right)\cong 0$$

where $a$ is the radius to pitch circle of said first gear, $b$ is the radius to pitch circle of said second gear, $d$ is the radius to pitch circle of said pinion, and $P$ is the angle included between the predetermined line of travel and a straight line through the centers of said first and second gears when said pinion is engaged with the rack in its ideal alignment whereby an error introduced by the swinging of said yoke to maintain said rack and pinion engaged is minimized.

References Cited by the Examiner

UNITED STATES PATENTS

| | | | |
|---|---|---|---|
| 833,848 | 10/1906 | Rundlett | 74—397 |
| 2,507,555 | 5/1950 | Berthiez | 74—397 |
| 2,841,025 | 7/1958 | Chayka | 74—409 |
| 2,876,652 | 3/1959 | Pankonin | 74—395 |
| 2,946,232 | 7/1960 | Jones | 74—409 |
| 3,175,415 | 3/1965 | Belshaw | 74—397 |

DON A. WAITE, *Primary Examiner.*